US012661688B2

(12) United States Patent
Nørkjær

(10) Patent No.: US 12,661,688 B2
(45) Date of Patent: Jun. 23, 2026

(54) ACOUSTIC PANEL EDGE

(71) Applicant: ROCKWOOL A/S, Hedehusene (DK)

(72) Inventor: Sten Nørkjær, Hedehusene (DK)

(73) Assignee: ROCKWOOL A/S, Hedehusene (DK)

( * ) Notice: Subject to any disclaimer, the term of this patent is extended or adjusted under 35 U.S.C. 154(b) by 248 days.

(21) Appl. No.: 18/252,099

(22) PCT Filed: Nov. 9, 2021

(86) PCT No.: PCT/EP2021/081115
§ 371 (c)(1),
(2) Date: May 8, 2023

(87) PCT Pub. No.: WO2022/096746
PCT Pub. Date: May 12, 2022

(65) Prior Publication Data

US 2023/0398569 A1 Dec. 14, 2023

(30) Foreign Application Priority Data

Nov. 9, 2020 (EP) .................................... 20206562

(51) Int. Cl.

| | |
|---|---|
| ***B05D 1/26*** | (2006.01) |
| ***B05D 1/16*** | (2006.01) |
| ***B05D 1/42*** | (2006.01) |
| ***E04B 9/00*** | (2006.01) |
| *B05D 3/04* | (2006.01) |

(52) U.S. Cl.
CPC ................ *B05D 1/26* (2013.01); *B05D 1/16* (2013.01); *B05D 1/42* (2013.01); *E04B 9/001* (2013.01); *B05D 3/0493* (2013.01); *B05D 2401/32* (2013.01)

(58) Field of Classification Search
None
See application file for complete search history.

(56) References Cited

U.S. PATENT DOCUMENTS

| | | | | | |
|---|---|---|---|---|---|
| 2,758,564 | A * | 8/1956 | Randall | B41F 23/06 | 118/309 |
| 3,357,516 | A * | 12/1967 | Cadotte | E04B 9/045 | 181/290 |
| 4,056,647 | A * | 11/1977 | Garrick | B44C 5/0461 | 427/284 |
| 4,248,379 | A * | 2/1981 | Hollstein | B05B 12/149 | 239/113 |
| 2014/0166836 | A1* | 6/2014 | Kabatsi | E04B 9/00 | 248/317 |
| 2015/0034248 | A1 | 2/2015 | Chapman | | |
| 2016/0296971 | A1* | 10/2016 | Hung | B05D 3/067 | |
| 2018/0023338 | A1* | 1/2018 | Werner | E06B 9/02 | 160/167 R |
| 2018/0258638 | A1 | 9/2018 | Hughes et al. | | |

FOREIGN PATENT DOCUMENTS

| | | | |
|---|---|---|---|
| CH | 372822 | A * | 10/1963 |
| CH | 382609 | A | 9/1964 |
| EP | 3590610 | A1 | 1/2020 |
| JP | H08132405 | A | 5/1996 |

* cited by examiner

*Primary Examiner* — Michael P. Rodriguez
(74) *Attorney, Agent, or Firm* — SALIWANCHIK, LLOYD & EISENSCHENK

(57) ABSTRACT

The invention provides a method and apparatus for treating at least part of an edge of an acoustic panel, and acoustic panels with such an edge treatment.

19 Claims, 11 Drawing Sheets

ACOUSTIC PANEL EDGE

CROSS REFERENCE TO RELATED APPLICATIONS

This application is a National Stage Application of International Application Number PCT/EP2021/081115, filed Nov. 9, 2021; which claims priority to European Patent Application No. 20206562.9, filed Nov. 9, 2020; the entire contents of which are incorporated herein by reference.

FIELD OF INVENTION

The invention relates to acoustic panels, in particular to ceiling tiles.

BACKGROUND

Man-made vitreous fibre (MMVF) panels that are used, for example, in the production of suspended ceilings are typically of a relatively low density, approximately 60-165 $kg/m^3$. It is desirable to use such a low density in order to obtain the desired acoustic properties and decrease the mass. Conventionally, panels are of standard form, having two opposed generally parallel major faces between which extend minor faces, generally known as the edge surfaces. Panels of this type have a tendency to exhibit surface defects. These defects are more pronounced at the edge surfaces than at either major face of a MMVF panel, since the major faces may typically be covered by a porous glass fibre fleece. Inhomogeneity causing defects at the panel edges may arise from fibre orientation, wool density variation and impurities, for example. The edge surfaces may exhibit undesirably low density at the surface, and protrusion of fibres from the surface, resulting in a “fluffy” appearance. The major faces are usually substantially planar, whereas the edge surfaces are commonly profiled in some way, for instance so as to allow concealed suspension of panels.

A similar problem exists for wood wool cement boards. Edge surface defects resulting from the internal panel structure of wood wool cement boards may be similar to those in MMVF panels, although the density may be different.

Defects at the edge surfaces can take various forms, including indentations, protrusions and exposed fibre ends or strand ends. This may have a negative influence on the visual appearance. A MMVF acoustic panel may be produced by splitting a MMVF substrate, sanding the cut surface and attaching a glass fibre fleece to the major face that will be visible when the panel is installed in a ceiling or wall. Panels are typically painted before installation and the imperfections of the edge surfaces may still be noticeable after painting.

Additionally, visible defects in the edge surfaces are especially undesirable for panels where portions of the edges might be on display in use, for example in a ceiling panel.

GB1394621 describes a method to strengthen the edges of a fibrous sheet material. This method entails applying a resin to the edges of the fibrous sheet material and curing the resin such that a hardened edge is obtained. The resin is applied as an emulsion containing a curing agent by a roller and must be heated to remove dispersion medium and to cure the resin. Unfortunately, the thermosetting acrylic polymer resins preferred for the method of GB1394621 add only some strength to the edges and do not properly compensate for the defects that are found in mineral fibre acoustic panels and wood wool cement panels.

WO2018/007413 provides a solution to unsightly panel edges by providing a foam layer onto the raw panel edges. The foam layer can be shaped to accommodate tolerances in the edge profile and does successfully smooth over the rough edges. This provides a good solution but there are some drawbacks. During expansion of the foam composition, penetration into the panel can be uneven, with the foam penetrating more into the less dense areas. This results in a variable thickness of the foam across the panel edge after curing and milling. To keep the foam thickness below 1 mm, precise positioning is required on the production line. In some cases a large amount of foam is wasted during the milling process. In addition, the curing time is quite long for the foam and it can be difficult to control and measure the foam layer thickness.

US2016/296971A1 discloses a method of powder-coating a heat-sensitive item such as chipboard. The edges are first covered with a banding to provide a smooth surface. Then a UV-curable sealant layer is applied. Powder coating is the final step and is not applied directly to the edge of a board. None of the mentioned heat-sensitive items noted in US’697 would normally be classified as acoustic boards or panels.

JP H08 132405A discloses a method for sealing with thermoplastic a surface of a wood-based plate, for example chipboard, such that the plate is resistant to high humidity. The main aim is to cover the major faces, with coverage of the edges being optional. High adherence is achieved by a laminar structure of wood board→adhesive layer→particle layer→thermoplastic layer. The particle layer is applied to the adhesive by spreading. None of the mentioned plate materials would normally be classified as acoustic boards or panels.

US2018/258638A1 discloses a panel which may form part of a suspended ceiling. The panel side surface may be coated with a liquid composition comprising disc-shaped inorganic particles, ionic dispersant and a liquid carrier such as water. The method of coating the side surfaces involves processing the liquid, which may be messy and entail additional cleaning of the apparatus.

EP3590610A1 discloses a method of coating a tile edge with a water-based coating using a continuous vacuum process. During the method of manufacture, only wet coating materials are used, primarily water-based coating materials.

It would be desirable to address the edge defects without the drawbacks of previous solutions.

SUMMARY

The invention provides a method of coating a minor face of an acoustic panel, the acoustic panel comprising two opposed major faces and one or more minor faces that extend between the major faces, the method comprising the steps of applying a powder to one or more minor faces, applying a binder to the same location on the minor faces as the powder, and then treating that location to produce a film on the minor faces.

“Acoustic panel”, “acoustic tile”, “acoustic MMVF panel” and the like as used in this description refer to materials that absorb sound, i.e. acoustic insulation materials. For example, man-made vitreous fibre (MMVF) panels have a very high porosity and an open surface which play a large part in the acoustic absorption capability of the panels. This porosity and open surface has drawbacks for the finished edges and especially corners, in terms of the robustness and appearance of these parts.

The powder has the capacity to compensate for defects in the surface of a minor face, to camouflage defects and smooth over and to close the surface of the edges of the panel.

The use of a powder rather than a purely liquid or foam surface treatment contributes to a faster and more consistent coating process. The use of a powder also enables the uniform filling of deeper holes or other surface defects in a minor face, by vacuum suction, controlled flow of fluidised powder from a fluidised bed powder application chamber, mechanical action such as scraping or a combination of techniques. Mechanical scraping is not dependent on air flow and enables holes in dense panels or areas with higher air flow resistivity to be filled as well as lower density panels or areas. The powder composition does not build up on production equipment, which is a major benefit compared to previous panel edge treatments using liquid or foam type treatments.

Furthermore, by using a particulate surface treatment before or instead of the more conventional waterborne paints, there is less shrinkage when the binder is cured and the uneven spaces of the uncoated panel edge are filled more consistently. This provides a higher quality end result compared to conventional panel edge treatments. Compared to a foam-based edge treatment, the invention results in an end product having a lower calorific value. Using a powder instead of a liquid reduces the cleaning required for the apparatus and may enable better control of ingress of coating material into the acoustic panel itself. Furthermore, it allows more accurate targeting of the coating material to the points where it is most needed, i.e. the least dense areas of the panel edge and any holes in the panel edge, without overloading other areas.

Treating the panel in this way provides a smooth and uniform surface which repairs or covers imperfections and strengthens the panel edge. This surface is suitable for painting, although in principle painting may not be necessary.

The minor face may be milled prior to powder coating, in order to provide a desired edge profile. This is particularly useful for suspended ceiling tiles, which often require a particular edge profile for the suspension system and any interlocking mechanism. Milling is preferably carried out before powder coating in order to avoid shedding powder between its application to the panel edge and curing. However, milling may be carried out after the step of film formation.

The powder may be applied to the minor face or portion thereof in any suitable manner.

A preferred method of applying the powder is vacuum suction. The acoustic panel, in particular a man-made vitreous fibre (MMVF) acoustic panel, may act as a filter in a vacuum system, such that powder can be sucked onto and/or into the portion of the panel surface on which the coating is required.

A preferred method of vacuum suction in the invention comprises a vacuum suction apparatus applied to a major face of the panel, covering of all surfaces on which a coating is not required, and a frame supporting the minor face to be coated. The frame is provided with an inlet for the powder, and the vacuum suction draws the powder through the inlet and onto and/or into the surface to be coated. In a production line, the panel may be moved through the frame in a continuous manner to provide a coating along the length of the panel.

Vacuum coating apparatus may be integrated into a milling apparatus in a production line, enabling efficient use of space and apparatus whilst at the same time providing the correct frame positioning, shape and size for supporting the minor face during a vacuum powder coating process.

Controlling powder flow is important during application, both to ensure that all intended areas are coated and to minimise powder spillage. Using vacuum to create an air flow from the application chamber and into the substrate will move the powder from inside the chamber and into and/or onto the tile edge due to negative pressure generated through the vacuum apparatus. However, when using only vacuum suction to generate airflow it may be difficult to obtain and/or maintain such a flow under all conditions. Especially on the first and last part of a panel edge, it can be difficult to shield off surrounding areas to prevent air from being sucked into the tile through these, instead of through the application chamber. This may result in powder not being applied to the first and the last part of the edge in a continuous manufacturing process. Furthermore, large compact areas inside the acoustic panel may block the air flow and thus prevent or reduce powder application on the edge. Despite these drawbacks, the vacuum process described above will result in a powder coating to the panel edge and still provides benefits compared to prior art processes using liquid coatings, paints, edge bandings and the like.

Fluidisation of the powder inside the application chamber overcomes this problem and is further preferred. Fluidised powder behaves like a liquid and will flow out of the application chamber if there is nothing holding it back, whilst simultaneously avoiding the aforementioned drawbacks of a liquid-based coating composition. The powder still moves from the chamber into and onto the panel edge, but the air flow and powder movement is primarily the result of positive pressure within the fluidised bed powder box (also referred to as the "application chamber" and "powder handling apparatus" herein) causing a pressure differential between the application chamber and the adjacent panel.

The powder application chamber ("powder handling apparatus") takes the form of a fluidised bed when the invention is implemented with fluidised powder. The base of the application chamber comprises an air-permeable plate, mesh screen or other suitable air-permeable base. An air inlet is positioned below the air-permeable plate, facilitating air to be blown upwards into the powder application chamber, causing the powder to fluidise.

Fluidised bed apparatus (also referred to in the art as "fluid bed" apparatus) for powder coating of objects in general is known in the art. However, the typical means for coating an object with fluidised powder is to dip the object into the fluidised bed. In the present invention, fluidised bed apparatus is used to liquefy powder and act as a reservoir for the fluidised powder which flows out of the apparatus (i.e. the powder application chamber) to a juxtaposed panel edge.

A shutter (also referred to herein as a gate or a valve) system for the application chamber has been developed for the invention, turning powder flow on and off. This is a preferred feature for the fluidised powder embodiment, but is not essential. Sensors connected to the shutter system on a continuous production line detect when an acoustic panel is approaching or leaving the application chamber and sensor signals are used for controlling exactly when to open and close the shutter, allowing fluidised powder to be applied to the entire length of the edge. Sensor systems may incorporate, for example, optical sensors, thermal sensors, pressure sensors or any other suitable means for detecting the presence and absence of panels at the powder coating stage of a continuous production line.

The shutter system may be positioned within the powder application chamber, or exterior to the powder application chamber. Preferably, the shutter system comprises a substantially cylindrical (annular) shutter wheel, the shutter wheel having interposed shutter rim walls and shutter rim openings at the exterior of the shutter wheel. The shutter rim openings and shutter rim walls form open and closed positions, respectively for the valve system.

The valve system may be in the form of a hoop (ring, annulus, continuous strip) placed exterior to the powder application chamber. The annulus comprises windows which form the shutter wheel openings and solid sections which form the shutter wheel walls. The annulus further comprises means for connecting to a motor, such as a second ring of apertures which may connect to teeth of a motor.

Preferably, the valve system comprises a shutter wheel located within the powder application chamber. This is particularly preferred when fluidised powder is used in the invention. A shutter wheel can be submerged within a fluidised powder bed and control the flow of fluidised powder from the application chamber to the panel edge.

Using a gate ("valve system", "shutter wheel") to control the flow of fluidised powder from an application chamber comprising a fluidised bed is especially beneficial for the powder coating of non-abutted panels on a continuous production line.

Fluidisation may be combined with suction, increasing the pressure differential through the substrate to be coated and thereby increases penetration depth of the powder into the panel edge and to help the particles to stay together prior to film forming, but it is not essential. Fluidisation of the powder will in many cases be enough for it to flow into and/or onto the substrate.

As an alternative to vacuum suction and fluidised powder methods, the powder may be applied to a minor face of the acoustic panel by mechanical packing. In a production line this may be achieved by pressing and/or vibrating powder between a frame and the panel minor face.

Regardless of the initial powder application method, preferably the powder layer is smoothed out by subsequent apparatus such as a stationary or vibrating frame to achieve a flat, uniform surface of the desired thickness.

In particular, mechanical packing may be used after vacuum suction to treat the powder layer. This may allow, for example, the density of the powder layer and its three-dimensional profile to be adjusted.

Mechanical treatment of the powder layer may include vibration within a frame. This may allow the powder to penetrate further into the acoustic panel, without falling away.

An entire minor face may be coated with the powder. Alternatively, a portion of a minor face may be coated, so that when installed in a room, such as in a suspended ceiling, only the visible parts of the minor face are powder coated. This saves on materials and costs.

The invention also provides an acoustic panel comprising two opposed major faces and one or more minor faces that extend between the major faces, wherein at least a portion of a minor face comprises a film formed according to the method of the invention.

The acoustic panel may include any of the preferred features described for the method of the invention.

The film formed by treating the layer that comprises powder and binder may have a thickness of from 50 to 1000 μm. Thickness of the coating can be measured by slicing off the panel edge, removing panel material such as fibres, measuring the dimensions of the remaining powder coating, measuring the volume of the sample in water using Archimedes principle and then calculating the average sample thickness.

The invention also provides a suspended ceiling comprising a support grid and a plurality of ceiling tiles which are acoustic panels as described above or made according to the methods described above.

The invention also provides an acoustic ceiling comprising a plurality of suspended vertical baffles, wherein the vertical baffles are acoustic panels as described above or made according to the methods described above.

The invention also provides acoustic panels for use as island acoustic panels, i.e. acoustic panels which are suspended from a ceiling independent of any grid system, typically with exposed edges.

The invention also provides acoustic panels for use in acoustic walls. An acoustic wall may comprise a grid system with a plurality of uniformly arranged acoustic panels. Alternatively, an acoustic wall may comprise one or more individual acoustic panels, typically having exposed edges, mounted individually to a wall. A further alternative comprises a plurality of acoustic panels in elongated form suspended from a ceiling to form a curtain.

Powder

The powder is preferably a composition that comprises a particulate filler, preferably an inorganic filler. An inorganic (rather than organic) filler reduces the overall calorific value of the coating and prevents the binder from flowing too much during the film forming process.

Any suitable powder coating composition may be used in the invention.

Suitable inorganic fillers include limestone, chalk, dolomite, talc, silica, barium sulphate, kaolinite, feldspar, bentonite, and mixtures thereof.

The powder composition may also include one or more inorganic pigments including titanium dioxide, iron oxides, carbon black, and/or one or more organic pigments and mixtures thereof.

The powder may comprise both organic and inorganic components. For non-fire rated applications, the powder may be 100% binder, but this is not preferred.

For a film comprising a high level of organic substances, the powder layer is preferably no greater than 1 mm thick in order to not detrimentally affect the calorific value of the panel as a whole and the fire class of the finished product.

Inorganic or low-organic powder coating layers may be especially useful for strengthening the edge of a fire-rated panel, regardless of layer thickness.

A binder for use in the invention is typically organic. The powder (if using a liquid binder) or the non-binder components of the powder (if using a particulate binder) may be a mixture of organic and inorganic components. Using entirely inorganic non-binder components is preferable for fire-rated applications.

The powder may comprise particles having a Dv50 median particle size by volume in the range 25 to 100 μm, preferably 40 to 60 μm, such as approximately μm. Preferably particles smaller than 5 μm are not included in the powder. Very large particles may present difficulties in retaining position in a powder layer when a vacuum is removed or when a mechanical support such as a frame is removed.

Some applications may use significantly thicker powder layers, for example up to 2 cm. Using the vacuum suction application, powder layers up to 2 cm can be achieved. In this instance, the vacuum suction should be in place up until the film-forming operation has stabilized the powder, so that the powder does not fall away from the panel edge.

Powder layers up to at least 1 mm thickness do not require extended application of vacuum suction: the powder is retained at the panel edge by inter-particle and particle-panel friction and adhesion.

In the invention, the maximum coating thickness is preferably in the range of 200 μm to 300 μm. Thicker films may be undesirable in terms of the fire rating of the finished acoustic panel and the quantity of powder needed to achieve a satisfactory surface finish for the panel edges. Coatings with a maximum thickness in the range of 200 μm to 300 μm enable the production of smooth-edged acoustic panels, with reduced porosity at the edges and with greater strength at the edges, especially at the corners, thus minimising damage during transport and installation of the acoustic panel.

Binder

The binder is the component that enables film-formation and thereby the formation of a smooth and uniform film coating on at least a part of a minor face.

The binder may be processed to form a film coating by any suitable method. Film-formation may involve one or more of curing, melting and re-solidifying, softening and re-hardening, drying, or any other film-forming operation. The film formation step should enable particles of the powder to stick together. Complete and prolonged melting and thus flow of the binder is preferably avoided, so as to reduce shrinkage and other forms of deformation of the film.

Preferably infrared radiation is used to heat the powder composition, allowing it to form a coherent film. Film formation using infrared heaters is very fast, in the order of seconds, enabling efficient integration of the coating process into a continuous production line.

After film formation, depending on the thickness of the powder layer there may be some powder particles remaining underneath the film. The film may be closed or have holes.

Particulate Binder

The binder in the invention may be a particulate binder. Preferably the binder is a component of each powder particle made from a homogeneous mixture of all powder coating ingredients.

Suitable particulate binders include thermoplastic binders such as polyethylene and PVC, and thermosetting binders such as epoxy, polyester, polyester-urethane and acrylate. UV-curable binders and infrared-curable binders are preferred due to the speed of transformation to a film, which is beneficial on a continuous production line.

As an alternative to a binder, the powder may comprise surface treated inorganic particles, the surface treatment comprising molecules that chemically bond to the particle surface, and which also react with molecules on neighbouring particles to form inter-particle links during the film forming step. Among others, various types of silanes or surfactants may be used as surface treatment.

When a particulate binder is used, it may be present in the powder in an amount of from 35 to 85 vol %, preferably 35 to 75 vol %, more preferably 40 to 60 vol %. Although a typical powder coating may comprise approximately 60 to 85 vol % binder, and this is usable in the invention, a lower binder content is desirable in the invention in order to reduce film shrinkage and the calorific value of the final product.

Liquid Binder

As an alternative to, or in addition to, a particulate binder as a component of the powder, the binder may be a separate component and in liquid form.

A liquid binder in the invention is usually applied separately to the powder. Once the powder is applied, a liquid binder is separately applied to the panel, to the same areas where the powder is applied. A liquid binder may suitably be sprayed onto the panel edge.

Suitable liquid binders include organic binders such as UV-curable acrylates, two-component curable epoxy or polyurethane binders and simple drying binders. Preferably the liquid binder is a single-component binder and forms a film without evaporation or any other type of significant shrinkage. However, two-component binders such as epoxy binders may be used in the invention.

Preferably the liquid binder is an organic binder. Inorganic liquid binders such as waterglass are less suitable for the invention because they require a long drying/curing time to form a film, and the resulting film is often too brittle for practical application.

Preferably the liquid binder is a 100% solids organic binder, i.e. not a suspension, emulsion or other kind of diluted binder formulation. This prevents excessive shrinkage during the film-forming step of the method of the invention.

As an alternative to spraying, a liquid binder may be encapsulated so as to be in particulate form, and mixed with the powder, thereby applied simultaneously with the powder.

Acoustic Panel

Acoustic panels—panels that attenuate sound, i.e. acoustic insulation panels—are typically porous. This contributes to their ability to absorb sound, but can also lead to inhomogeneity at the minor faces. In the present invention, the porous nature of acoustic panels is useful in the implementation of vacuum suction of powder, because the panel itself can act as a vacuum filter, allowing the passage of air but not a high degree of penetration of the powder.

For an acoustic panel to have useful sound attenuation properties for use as, for example, a ceiling tile or a wall tile, the porosity is typically high. Porosity of an acoustic panel can be measured according to methods known to those skilled in the art of acoustic building materials.

Preferably the acoustic panel is rectangular. Preferably a part of each minor face is coated with the powder composition. Opposite minor faces may be coated simultaneously.

The acoustic panel generally has the form of a conventional panel, so that at least one minor face extends between two major faces, which are generally parallel. The acoustic panel will have a thickness that is defined by the distance between and perpendicular to the two major faces.

The acoustic panel used in the invention may comprise first and second major faces which are generally substantially parallel, and one or more minor faces extending between the major faces. Usually the major faces are substantially planar and are substantially rectangular (often square), although other shapes are of course possible.

The acoustic panel may be any acoustic panel. Suitable panel types include MMVF panels and wood wool cement panels. Preferably the acoustic panel is a MMVF panel. A finer edge profile for the surface of the minor face, for example grooves or recesses, may be possible when using a MMVF panel due to the finer fibres.

The invention is particularly beneficial when the panel is a man-made vitreous fibre (MMVF) panel. Due to the manufacturing process of such panels, some areas may be non-homogenous, for example where an excess or deficit of binder or fibres is present. The powder and the vacuum application technique used in some implementations of the invention are especially well suited to compensate for the edge defects at the minor face of a MMVF panel.

At densities typical for MMVF or wood wool cement panels, there may be visible defects present at the minor faces of the panel. Such defects may be in the form of indentations and protrusions, areas with reduced or excessive binder content, areas of lower or higher than normal density, burned areas, areas with uncured binder or different kinds of impurities. Defects may decrease the strength of the panel and also may result in non-uniform panel edge shape. Ideally in use as, for example, a suspended ceiling, the acoustic panels have uniform shape and uniform straight and smooth edges. The powder applied to a minor face can compensate for these defects, providing a more uniform shape and appearance and strengthening weaker areas.

The panel may typically have a length in the range of 600 to 2400 mm, which is standard length in Europe, but other lengths could be relevant. For instance for some applications, such as wall panels, the length can be up to 2700 mm.

The panel may typically have a width in the range 300 to 1200 mm.

The panel may have a thickness in the range 10-100 mm, preferably 10-40 mm. The thickness of the panel corresponds with the average distance between the two major faces, measured normal to the major faces. The thickness of a MMVF panel is suitably 10-40 mm. The thickness of a wood wool cement panel may suitably be 10-50 mm, such as 25 or 35 or 50 mm, preferably 25 or 30 mm.

The one or more minor faces of a panel suitable for use as a ceiling panel may have a 3D profile. For concealed edges there will be recesses and grooves to accommodate the suspension means, such as common grid systems based on inverted T-profiles.

Preferably at least one, preferably both, of the major faces of the panel, are exposed MMVF or wood wool cement, and are not provided with an impermeable facing. They can be provided with a permeable fibrous facing.

One or both major faces of the panel may be provided with a glass fibre fleece. This provides a uniform surface appearance and texture whilst retaining the acoustic properties of the panel.

MMVF panels suitable for use in the invention may have a density of 50 to 180 kg/m$^3$. This density of MMVF is particularly suitable for acoustic suspended ceiling panels. Preferred MMVF tile densities are 55 to 175 kg/m$^3$ and 65 to 165 kg/m$^3$. MMVF panels having density towards the lower end of these ranges are especially preferred for use in the invention.

The MMVF panel may comprise a bonded, nonwoven three-dimensional network of MMVF. The MMVF can for example be stone fibres, glass fibres, slag fibres and ceramic fibres.

Preferably, the MMVF are stone fibres.

Stone fibres may have the following composition, all amounts quoted as wt % as oxides and all iron oxides being quoted as $Fe_2O_3$:

| | |
|---|---|
| $SiO_2$ | 25 to 50, preferably 38 to 48 |
| $Al_2O_3$ | 12 to 30, preferably 15 to 28 |
| $TiO_2$ | up to 2 |
| $Fe_2O_3$ | 2 to 12 |
| CaO | 5 to 30, preferably 5 to 18 |
| MgO | up to 15, preferably 4 to 10 |
| $Na_2O$ | up to 15 |
| $K_2O$ | up to 15 |
| $P_2O_5$ | up to 3 |
| MnO | up to 3 |
| $B_2O_3$ | up to 3 |

An alternative stone fibre composition may be as follows, all amounts quoted as wt % of oxides, and all iron oxides being quoted as $Fe_2O_3$:

| | |
|---|---|
| $SiO_2$ | 37 to 42 |
| $Al_2O_3$ | 18 to 23 |
| CaO + MgO | 34 to 39 |
| $Fe_2O_3$ | up to 1 |
| $Na_2O$ + $K_2O$ | up to 3 |

The MMVF nonwoven three-dimensional network of the MMVF panel may be bonded using any suitable binder. Suitable binders include phenolic, epoxy, acrylic, water glass, polypropylene, polyethylene, and bicomponent binders.

Wood wool cement panels are also suitable for use as the acoustic panel in the invention. A wood wool cement panel may comprise strands of wood—the "wood wool" component is sometimes referred to as "excelsior"—that are bonded with cement. Wood strands may have the form of a tape, with a tape width of from 0.5 to 3 mm. The wood strands may lie substantially in the plane of the major faces of the panel, such that many cut ends of wood strands are present at the minor faces of the panel.

The wood wool cement panel may consist entirely of wood wool and cement. Alternatively, the wood wool cement panel may be a "sandwich panel", comprising two wood wool cement boards separated by a core material such as expanded polystyrene, MMVF, or other insulating materials.

Application of the Invention

The acoustic panels in accordance with the invention are useful in a variety of acoustic solutions for ceilings and walls.

The acoustic panels may be arranged in an array, supported by a grid. Such grid systems are applicable for both walls and ceilings, the latter of which is typically referred to as a suspended ceiling. In a grid system, the panel edges may be partially or entirely hidden by virtue of close location to an adjacent tile. However, defects in the panel edges may still be visible when the panels are suspended together, and so the invention is useful in providing a defect-free, uniform appearance for these types of panels, in addition to strengthening the edges to protect from damage during transport and installation.

The acoustic panels may also be implemented individually in applications where part or all of a panel edge may be exposed and visible in the installed state. This scenario is applicable both for walls and ceilings. Individual acoustic panels may be mounted on a wall, with the panel edges being exposed. Individual acoustic tiles may also be suspended from or mounted to a ceiling individually, with the major faces substantially parallel to the floor. This setup for ceilings is often referred to as acoustic islands. Another mode for implementing acoustic tiles individually is vertical baffle ceilings. Individual acoustic panels are suspended from a ceiling and may have one or more exposed edges. Similar to a vertical baffle ceiling, a plurality of long and narrow baffles may be suspended from a ceiling to form an acoustic curtain as a room divider or privacy screen. The invention is useful for these applications in particular due to the uniform visual appearance that will be obvious during the lifetime of the installed product, but also because the exposed edges may require greater mechanical strength to protect against knocks, scrapes and the like during the lifetime of the product.

DETAILED DESCRIPTION

Figure 1:
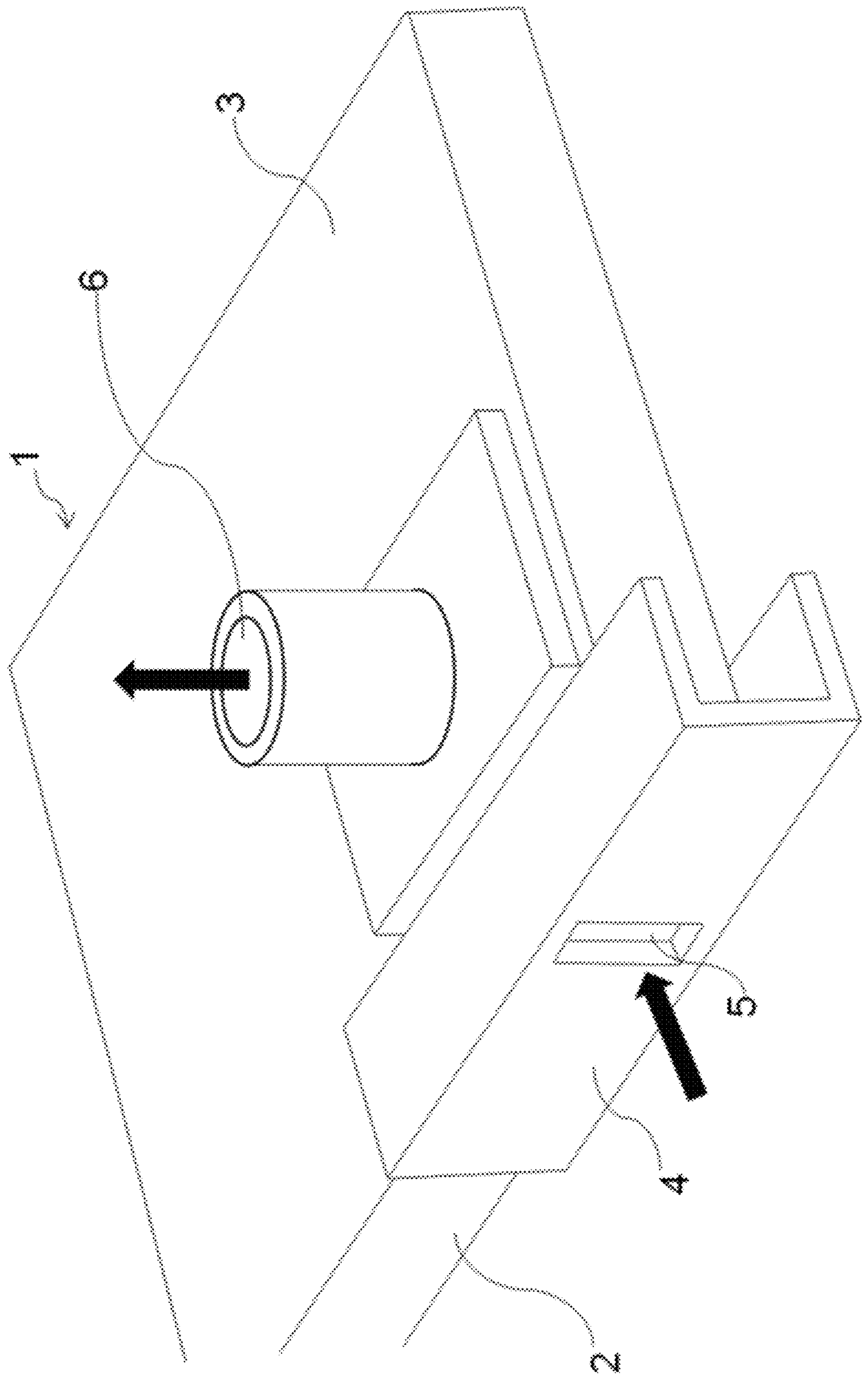
FIG. 1 shows a portion of apparatus for use in the method of the invention

FIG. 1 illustrates how a minor face 2 of an acoustic panel 1 can be coated with powder to form a layer, which is then cured further down the production line to form a film. The acoustic panel 1 comprises opposing major faces 3 with four minor faces 2 extending between the major faces 3. In the production line, the acoustic panel 1 moves through a frame 4. The frame may enclose a single minor face 2, but preferably opposite minor faces 2 are subjected to a powder coating process simultaneously, with a frame 4 enclosing opposite minor faces 2 of the acoustic panel 1 (second frame not shown).

The frame 4 comprises a vacuum suction inlet 5 through which powder is drawn and sticks to the minor face 2. In this example the acoustic panel 1 is a bonded MMVF panel, which acts as a filter, thereby trapping the powder against the minor face 2 when air flows from the vacuum suction inlet 5 to the vacuum suction outlet 6.

In a production line, the powder is applied in a continuous process, such that the panel 1 moves continuously along the frame 4 and continuously against the vacuum suction outlet 6. Once the vacuum suction is removed, the powder remains adhered to the minor face 2 and the panel 1 is transported to a film formation zone (not shown). Heat is applied to cure the binder component or to otherwise form a film by another physical or chemical process. Preferably infrared heating is used because this achieves fast curing and thereby takes up least space on the production line, but other types of heating such as convection heating could be used in cases where sufficient space is available.

Although the vacuum suction outlet 6 and thus the vacuum suction head is illustrated as being applied to the major face 3 on the upper side of the panel on a conveyor, it may equally be placed on the major face 3 on the underside of the panel, or on the minor face 2 of the panel immediately downstream of the powder inlet 5 and frame 4. These alternative arrangements are not shown in the figures.

In other embodiments, the powder is applied to the panel edge 2 by means of controlled flow of fluidised powder from an application chamber 70 comprising a fluidised bed. Aspects of this are shown in FIGS. 11-14. The vacuum suction inlet 5 and outlet 6 are not essential when the fluidised bed is used, because the positive pressure from the fluidised bed generates a pressure differential causing airflow and fluidised powder flow in the direction of the panel edge 2. Nevertheless, vacuum suction may optionally be used in order to hold the powder in place on the panel edge 2 prior to the film forming zone. This also applies if the powder is applied to the panel edge 2 by means of mechanical packing (not shown).

Figure 2:
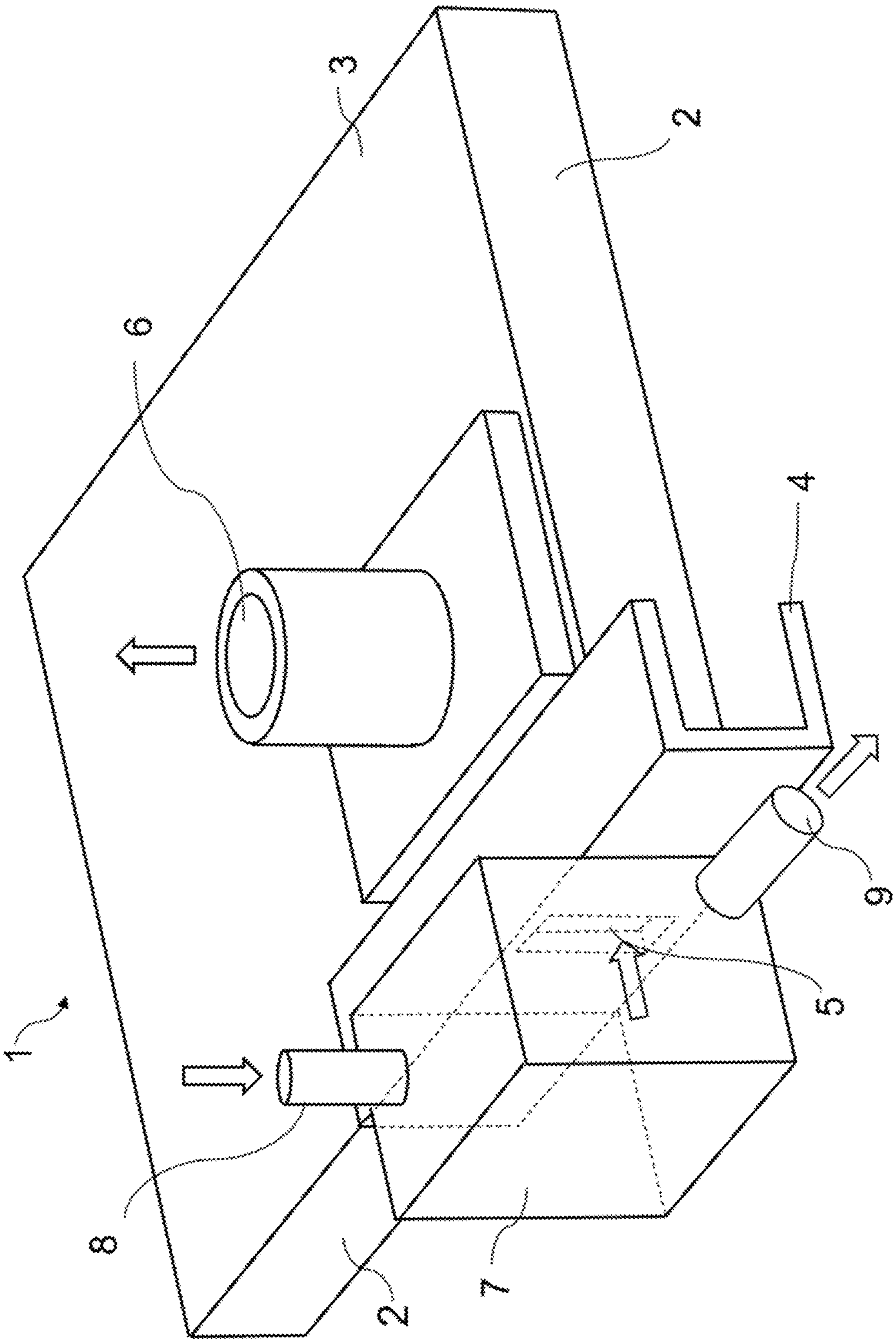
FIG. 2 shows a supplementary part of the apparatus of FIG. 1

In FIG. 2, powder handling apparatus 7 is shown supplementary to the details described for FIG. 1. The powder handling apparatus 7 may also be referred to as an "application chamber" or a "powder application chamber". The apparatus 7 comprises a powder inlet 8 and a powder outlet 9 and is configured to supply powder to the vacuum suction inlet 5. Vacuum suction inlet 5 is also the exit route for powder travelling towards panel edge 2. A silo (not shown) which acts as a powder reservoir may be fitted to the powder inlet 8. Powder from the powder outlet 9 may be cleaned and recirculated to the powder inlet 8. When using a MMVF panel, escaped fibres are also removed by the powder outlet 9. Fibres and powder are separate prior to recirculation to the powder inlet 8, so that the powder is not wasted and the powder layer is not contaminated by loose fibres. This recycling process is especially useful on a continuous production line, because it prevents build-up of excess powder and loose fibres in the apparatus 7.

Figure 3:
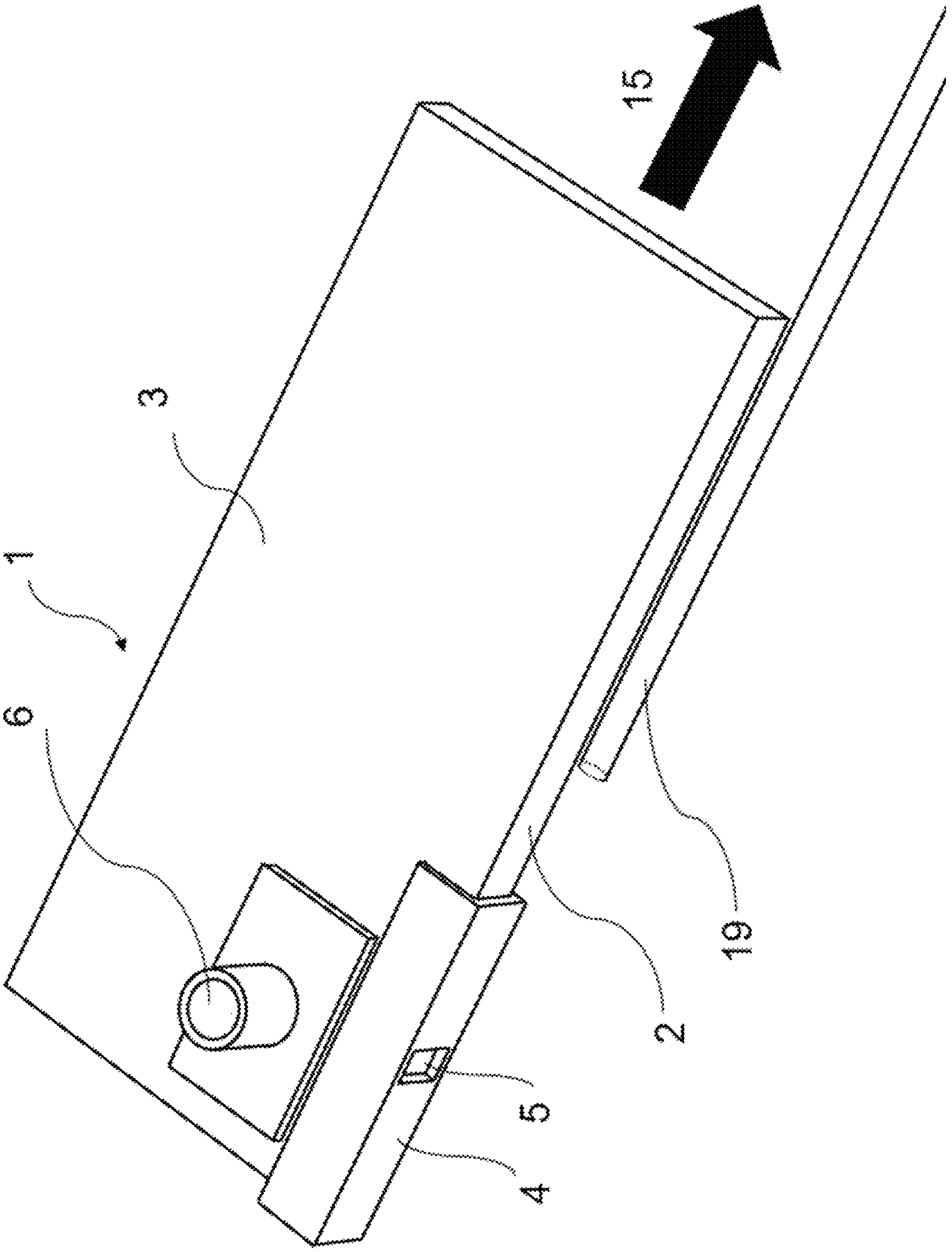
FIG. 3 shows a heating element in combination with a portion of a powder application apparatus for use in the invention

In FIG. 3, a heater 19 is illustrated downstream of the powder application apparatus. These stages are illustrated as being rather close in location, but in reality may be spaced at any suitable distance to meet the needs of a production line. The heater 19 may be any kind of heating apparatus. Preferably infrared heating is used for the heater 19 because this is much quicker than e.g. convection heating; rapid film formation is important in a continuous manufacturing process.

Figure 4:
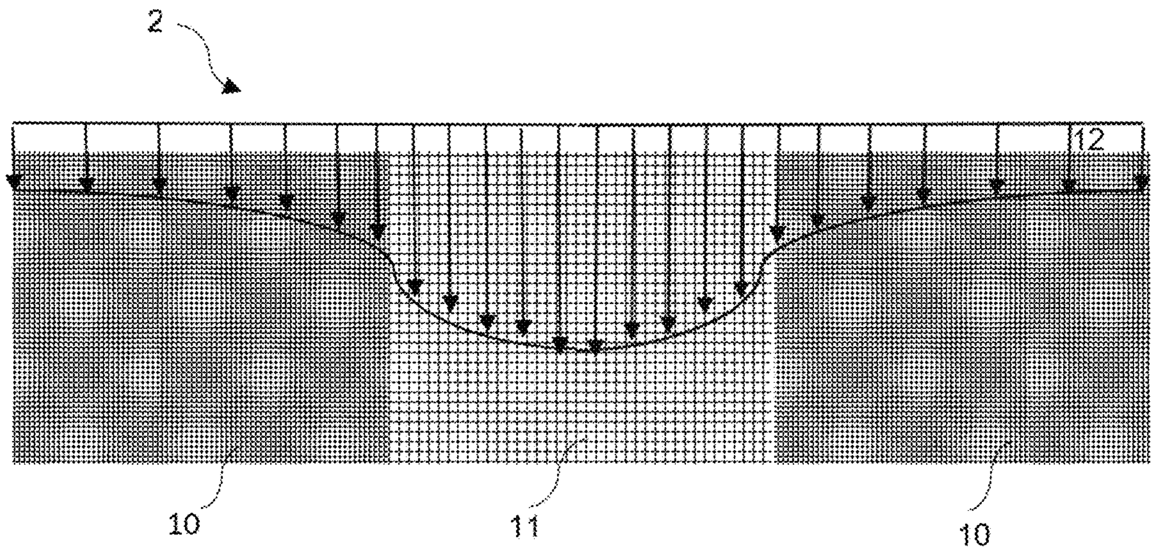
FIG. 4 shows how density of the acoustic panel affects powder loading

FIG. 4 shows a schematic cross-section of a panel edge 2 with areas of higher density 10 and lower density 11. Powder is drawn onto the panel edge 2 by vacuum suction in the direction of the arrows 12. More powder is transported to and penetrates further into the lower density areas 11 due to the lower resistance to airflow and preferentially settles in the lower density areas 11. This function of the powder contributes to the even, finished surface achieved in the method of the invention.

Figure 5:
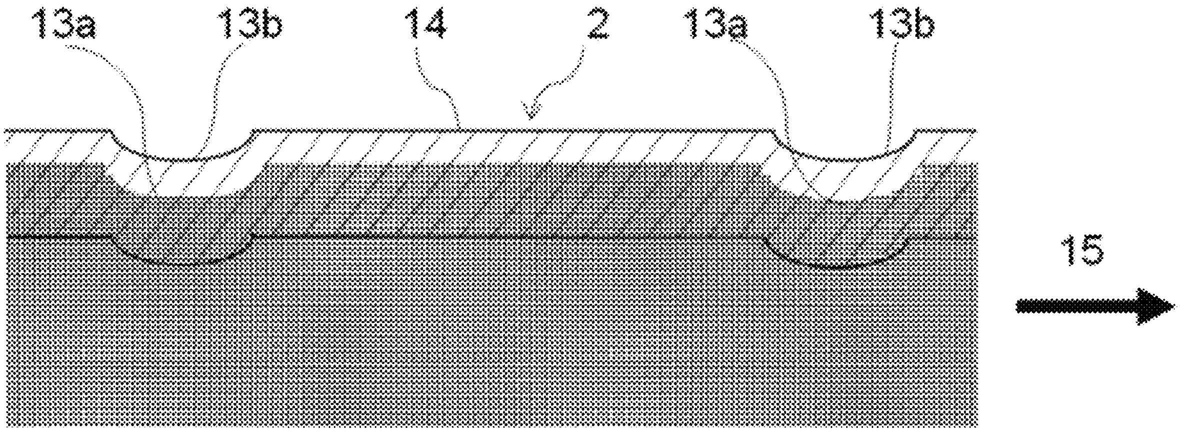
FIG. 5 shows how a prior art paint layer without powder coating retains surface defects even after painting

A painted panel edge 2 (prior art) is shown schematically in FIG. 5. The paint, which is usually waterborne in this context, settles evenly on the panel edge 2, regardless of edge defects 13*a*, forming a uniform film thickness. This means that the painted surface 14 retains the edge defects 13*b*.

Figure 6:
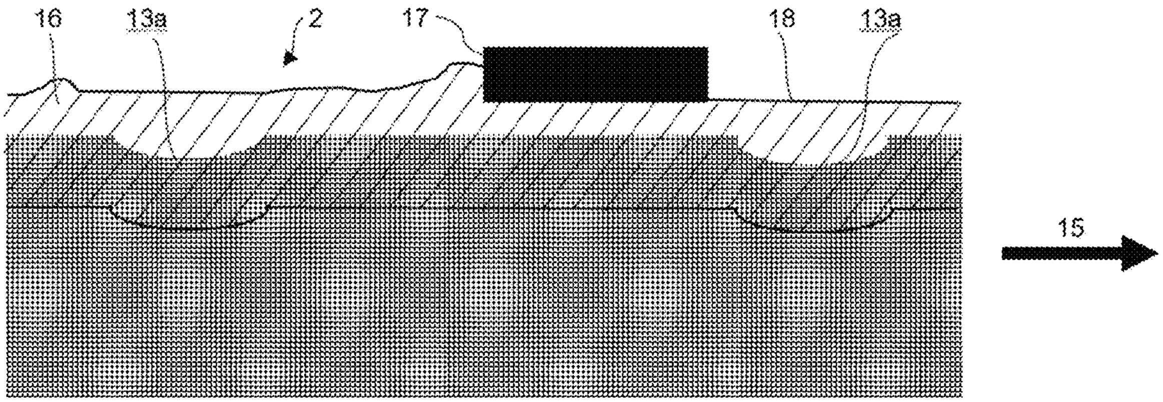
FIG. 6 shows how a smooth surface is achieved with powder coating at the same time as different powder loading along the panel edge.

FIG. 6 shows schematically how the powder application of the invention can both provide a smooth exterior surface to a panel edge and fill in the surface defects. This results in a uniform, strengthened edge, which compensates for differences in density, holes and any other inhomogeneity in the raw panel edge. The panel moves along a continuous production line in the direction of arrows Powder 16 has been applied to a minor face 2 of the panel and has filled out the surface defects 13*a*. A fixed guide element 17 smooths out the powder 16 to make a flat surface 18 ready for film forming (in the case where the powder 16 comprises a binder) or for spraying of binder and then film forming (in the case where the binder is separate from the powder 16).

Figure 7:
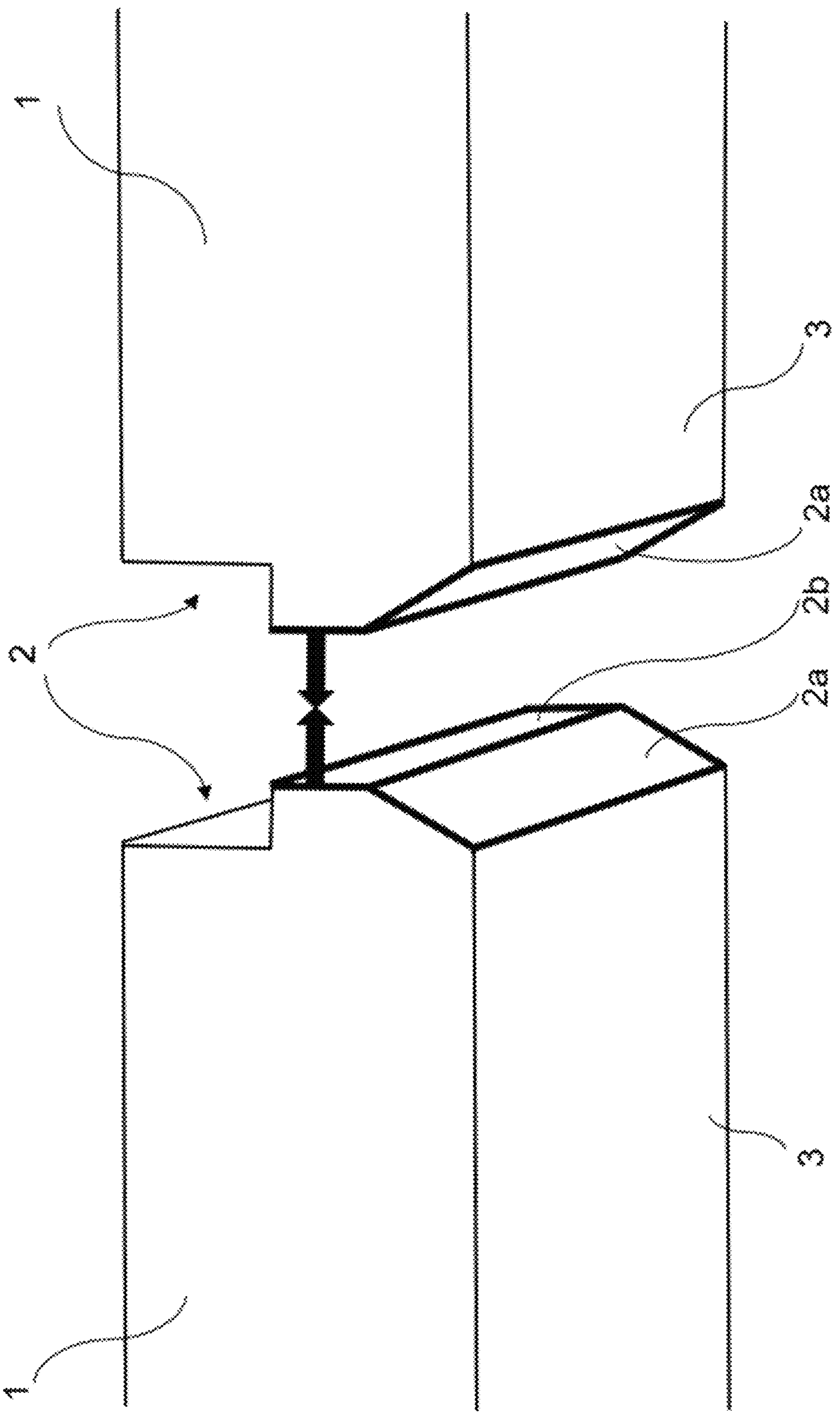
FIG. 7 shows how the minor face of a panel can have several distinct surfaces, which may not all require coating.

In FIG. 7, two acoustic panels 1 are illustrated side-by-side. Each panel has a minor face 2 having a distinct edge profile, which is specially adapted for a suspended ceiling. The individual surfaces 2*a* of each panel edge 2 will be visible in the installed state and the individual surfaces 2*b* will match to face each other in the installed state. Surfaces 2*a* and 2*b* are treated in accordance with the invention, whereas the remaining two individual surfaces of each panel edge 2 in this example are left untreated because they will not be visible, thereby saving materials and costs. The installed state is illustrated in FIG. 8.

Figure 8:
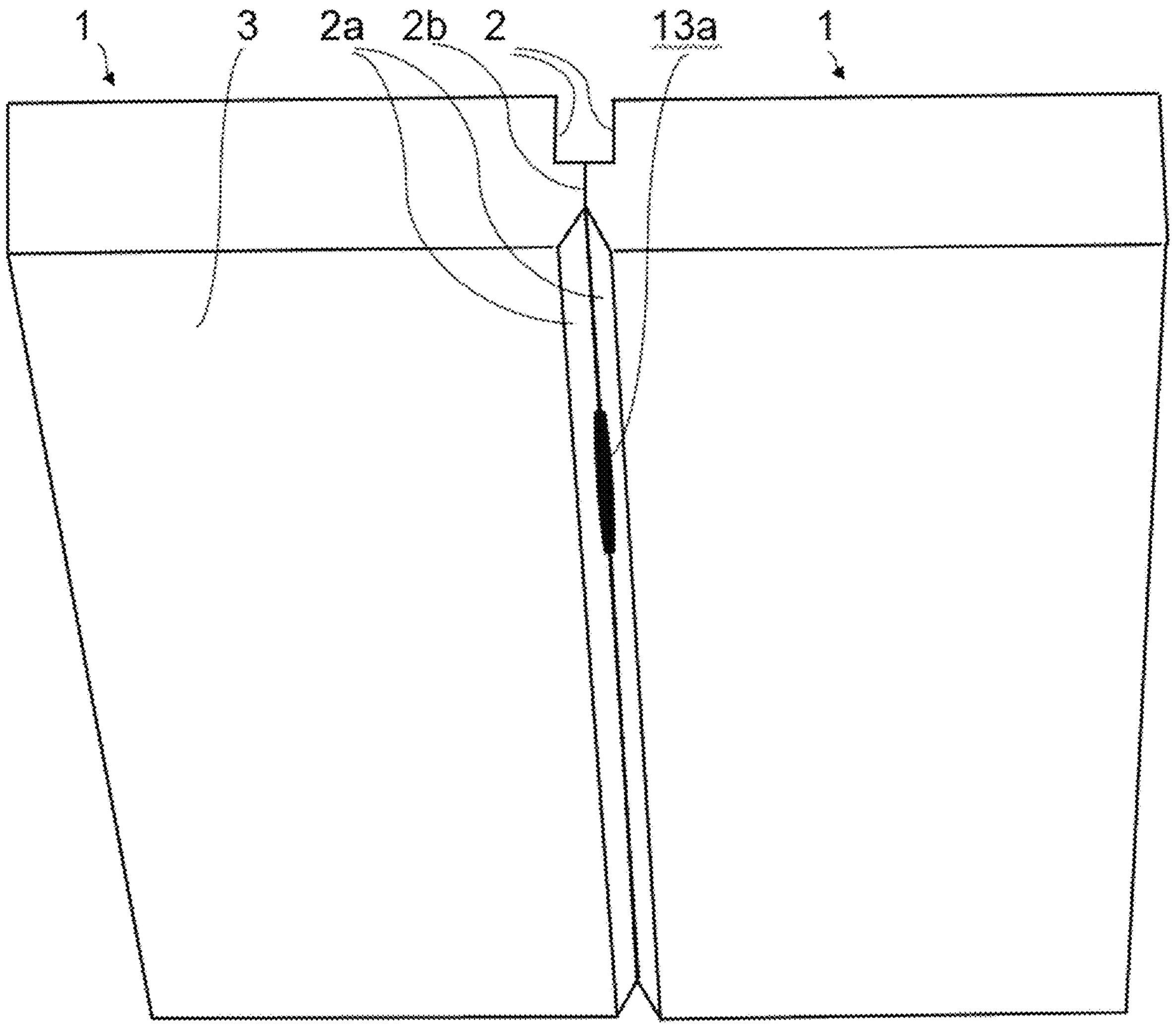
FIG. 8 shows how defects can still be visible for surfaces of the minor face which are not themselves exposed.

FIG. 8 shows schematically the benefits of the invention in a suspended ceiling comprising a plurality of adjacent acoustic tiles 1. The acoustic tiles 1 have a special edge profile to enable suspension from a grid. In the example shown in FIG. 8, the minor face 2 is thus made up of four distinct surfaces. Although only two special edge profiles are shown in cross section in FIG. 8 for illustrative purposes, in a real life application one or more of the remaining three minor faces (not shown) of each rectangular panel would normally also comprise a special edge profile and an array of many acoustic tiles would be provided to make up a whole ceiling. The major face 3 shown in FIG. 8 is visible to a person standing underneath the ceiling. One of the surfaces of the minor face 2 is visible when the suspended ceiling is in place and one of the surfaces abuts to an adjacent tile. Any defects 13*a* in the topography of the abutted surface will be visible when the suspended ceiling is in place, even though that surface is not itself exposed.

In this type of end-use application, the method of the invention may suitably be implemented on the exposed surface and the abutted surface, but not on the remaining parts of the minor face, which will not be visible in use. This reduces the materials needed to achieve the uniform visual appearance of the minor faces of the acoustic tiles.

Figure 9:
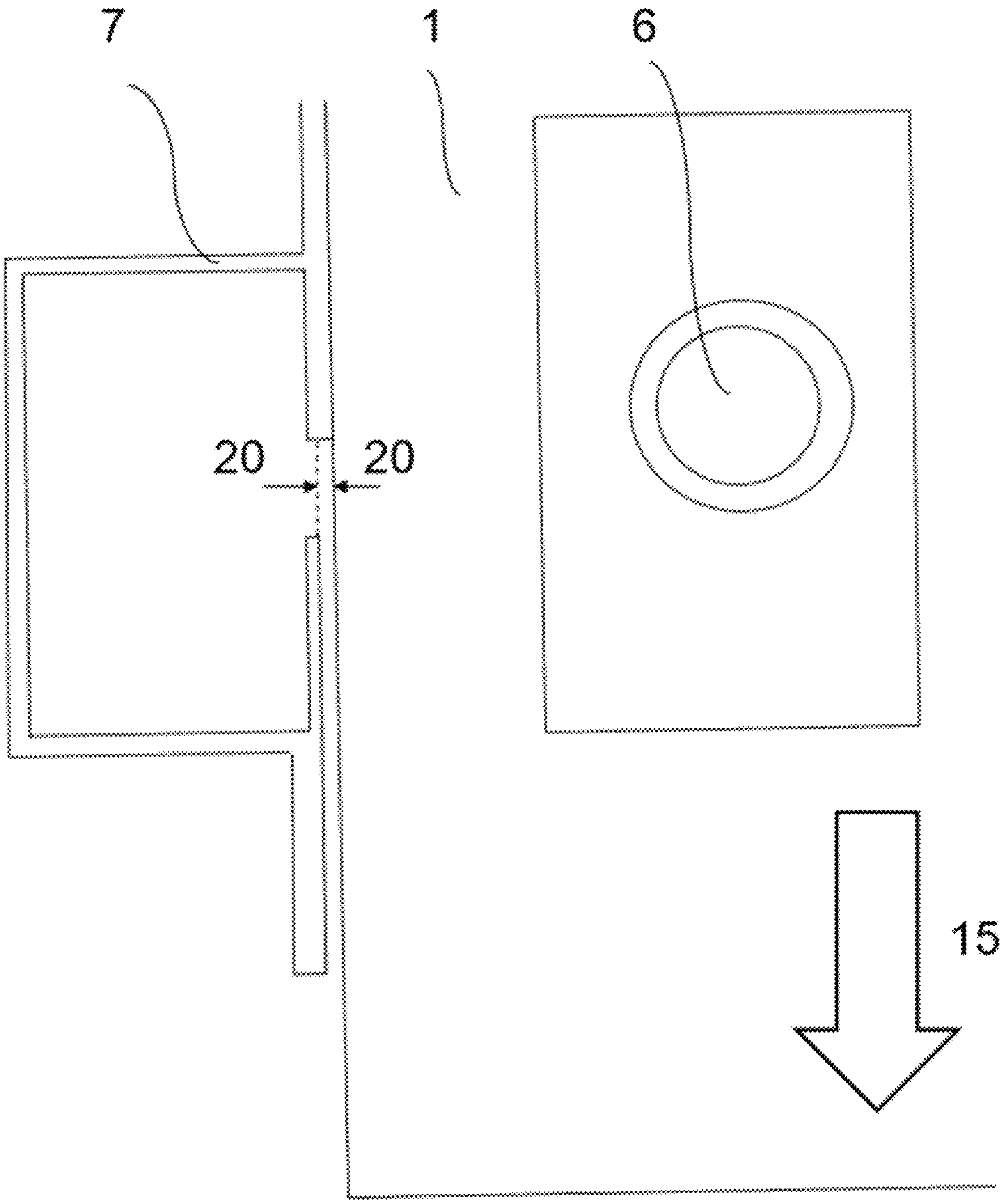
FIG. 9 shows a panel top view during powder application.
Figure 10:
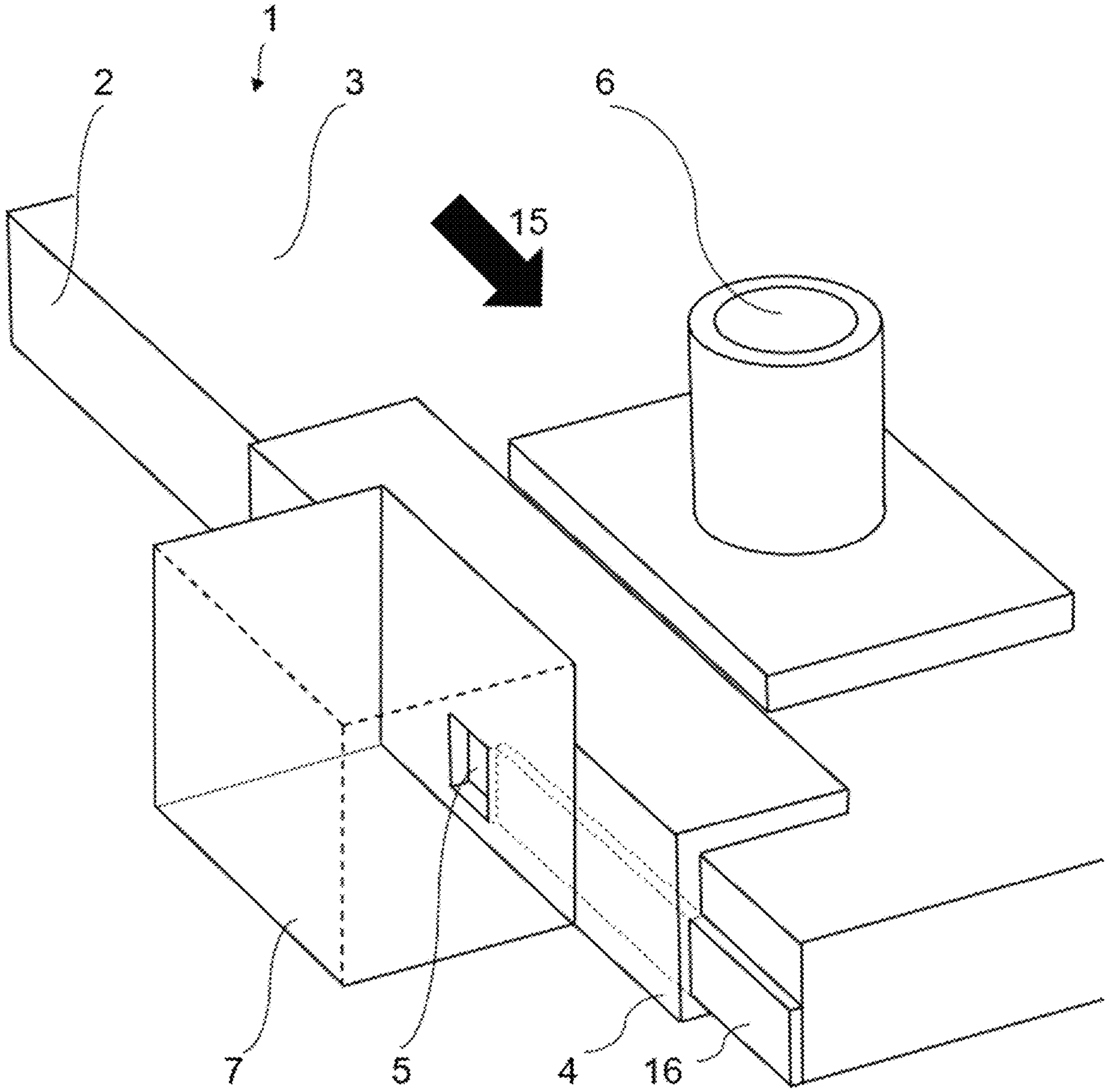
FIG. 10 shows a panel perspective view during powder application.

FIGS. 9 and 10 show an embodiment of how a certain thickness of the powder layer can be achieved in practice. The dimensions in these figures are exaggerated to demonstrate the principle. For thinner powder layers of approximately 1 mm or thinner, the powder remains in place after the vacuum is removed and before the film-forming process, due to e.g. friction, electro static forces acting at the surface of fibres and particles, and moisture. The vacuum suction may however influence powder at greater distances away from the panel edge, for example up to approximately 2 cm thickness of powder. In these cases, the powder will not all remain adhered to the surface between removal of the vacuum suction and beginning of the film forming process.

In FIG. 9 a panel 1 is shown moving through the powder application stage of a production line. The panel 1 travels in direction 15 and a vacuum suction is achieved in the same manner as described above, with vacuum outlet 6 being shown in this case on the upper major face of the panel 1. However, in this and other embodiments including those described with respect to FIGS. 1-8, the vacuum suction outlet 6 may be located at the underside of the major face or on the minor face immediately ahead of the powder and vacuum inlet apparatus 7.

In FIG. 9, a gap, shown between arrows 20, is provided between the minor face to which the powder is applied and the apparatus 7. This gap smooths the powder and controls its thickness. This is useful in all implementations of the invention but has particular utility when a thicker powder layer, for example up to 2 cm, is applied to the panel edge 2.

The same principle can be seen in more detail in FIG. 10. The thicker layer of powder 16 requires continuous vacuum suction to be held onto the panel edge 2 until film formation. This may be achieved by implementing a larger vacuum head, elongated in direction 15, and/or by providing a plurality of vacuum suction heads along the production line. The powder 16 is applied to a portion of the minor face 2 and its shape and thickness can be controlled by the frame 4, in particular the interior profile of the frame 4 and its distance from the panel edge 2, i.e. the size of the gap 20 as shown in FIG. 9. The frame 4 may be angled relative to the panel edge 2 so that the final powder thickness is not exactly the same as the gap 20.

A preferred embodiment of the invention utilises a fluidised bed in order to handle the powder in the same manner as if it were a liquid. Fluidised bed apparatus and methods are known to those in the art and not shown here; the application chambers 7 and 70 illustrated in the figures may incorporate a fluidised bed system instead of a simple hopper.

The use of a fluidised bed and fluidised powder enables a more even coating of the panel edges, especially at the corners. It is preferred to use a valve system in combination with the fluidised bed because, although still dry and thus not messy like prior art systems, the fluidised powder flows in similar manner as a liquid and will continue to flow from the outlet 90 even when there is no juxtaposed panel edge to coat.

A valve system has been developed for use with the invention. Although described with respect to a fluidised powder, it could also be used with a conventional hopper or other powder handling apparatus (application chamber) 7. A preferred implementation of the valve system is described below with respect to FIGS. 11-14.

Figure 11:
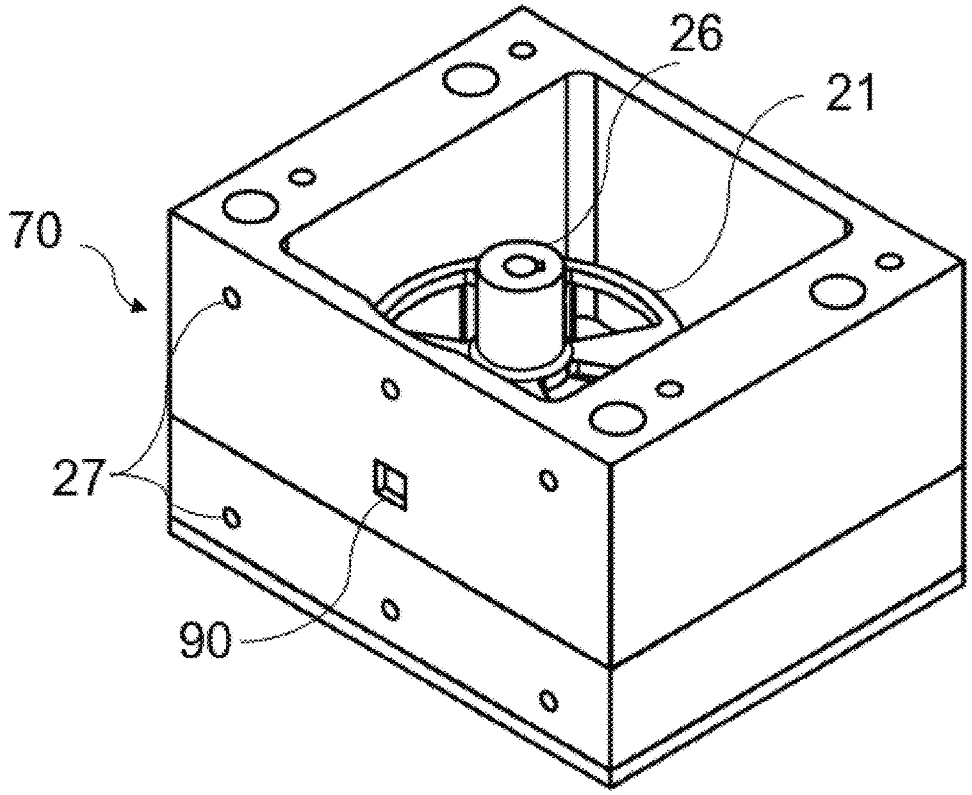
FIG. 11 shows a gate system in the open position, for controlling the flow of powder onto the panel edge.
Figure 12:
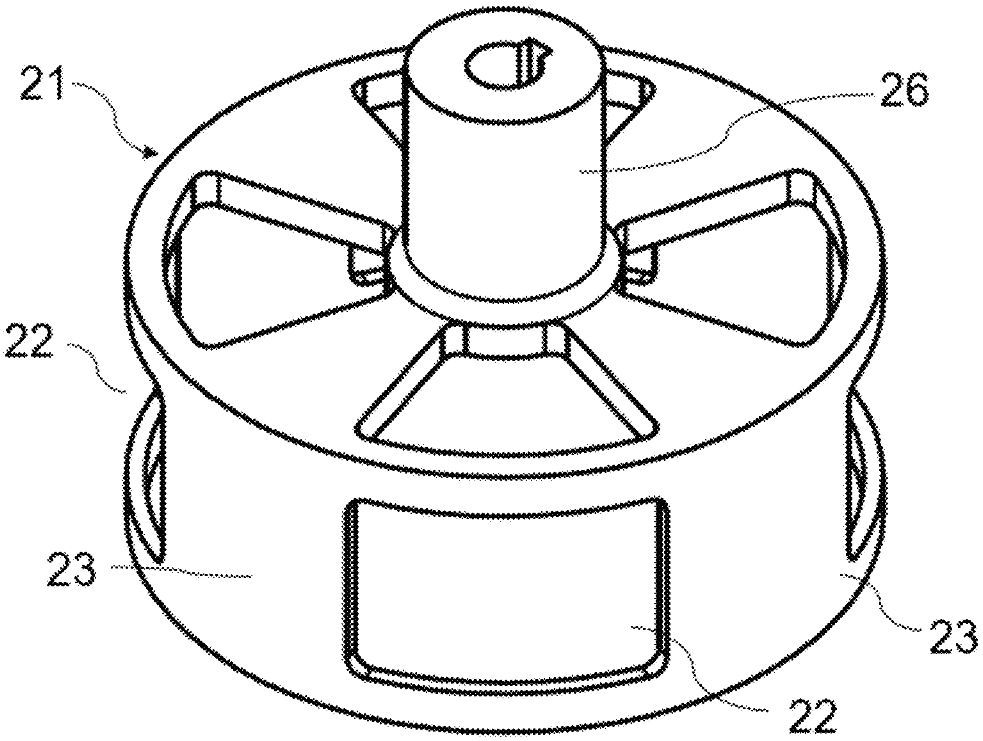
FIG. 12 shows the rotating component of the gate system of FIG. 11, in the closed position.

The valve system illustrated in FIGS. 11-14 comprises a shutter wheel 21 housed within application chamber 70, as shown in FIG. 11. During a continuous production line process, the shutter wheel 21 is completely submerged within the fluidised powder inside the application chamber 70. Powder is introduced into the application chamber 70 from the top and falls into the fluidised bed, thereby becoming fluidised. The shutter wheel 21 may be substantially cylindrical as can be seen in FIG. 12. The side wall of the shutter wheel 21 comprises alternating shutter rim openings 22 and shutter rim walls 23. The openings 22 and walls 23 align with powder outlet 90, thereby forming a valve for the fluidised powder in the application chamber 70. As a minimum there is at least one shutter rim opening 22 and at least one shutter rim wall 23. The shutter wheel comprises an axel 26 connectable to a motor (not shown).

The rate of input of powder into the application chamber 70 may optionally be controlled by means of a floating device in the fluidised bed, which ceases to break a laser beam when the level of fluidised powder with the application chamber 70 is too low (not shown). The floating device is in communication with a valve for the powder inlet (this optional feature is not shown).

The application chamber 70 comprises a powder outlet 90 through which the fluidised powder flows from the application chamber 70 to the panel edge (not shown in FIGS. 11-14). The shutter wheel 21 rotates such that the outlet 90 is alternately juxtaposed by a shutter rim opening 22 and a shutter rim wall 23. FIG. 13A shows the shutter wheel 21 acting as an open valve such that powder may flow from the application chamber 70 an onto a panel edge (not shown in FIGS. 11-14), i.e. when a shutter rim opening 22 juxtaposes the outlet 90. Flow of fluidised powder may be effected by means of positive pressure from within a fluidised bed. FIG. 13B shows the opening 90 juxtaposed by a shutter rim wall 23, i.e. a closed valve such that fluidised powder does not flow.

Figure 13A:
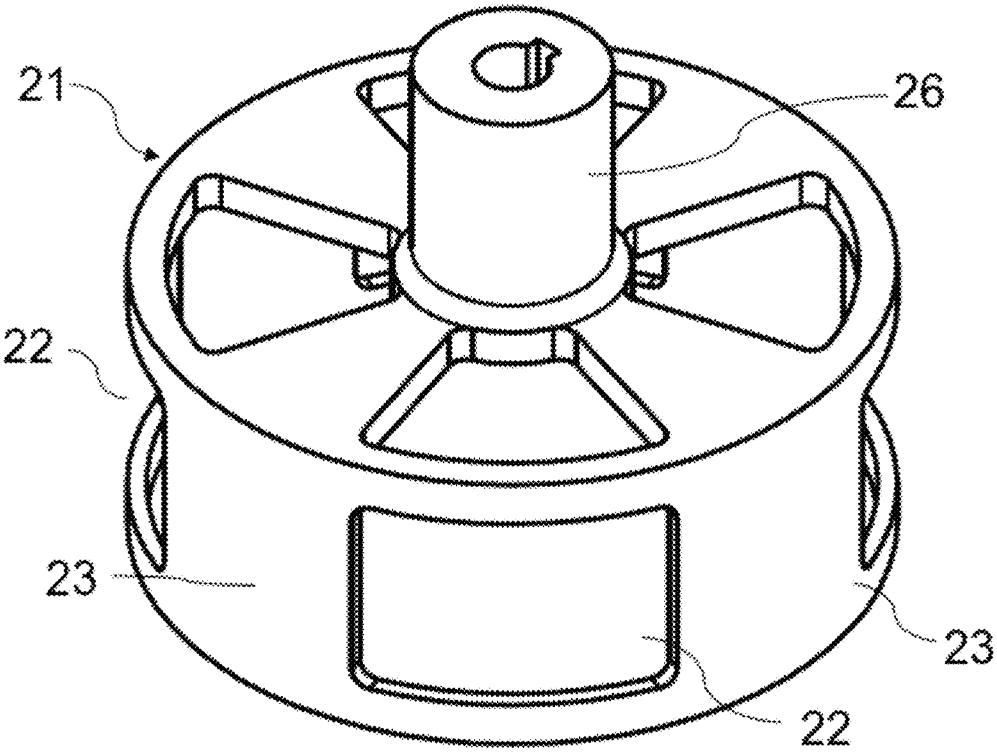
FIG. 13A shows a cross-sectional view of the gate system from above, in the open position.
Figure 13B:
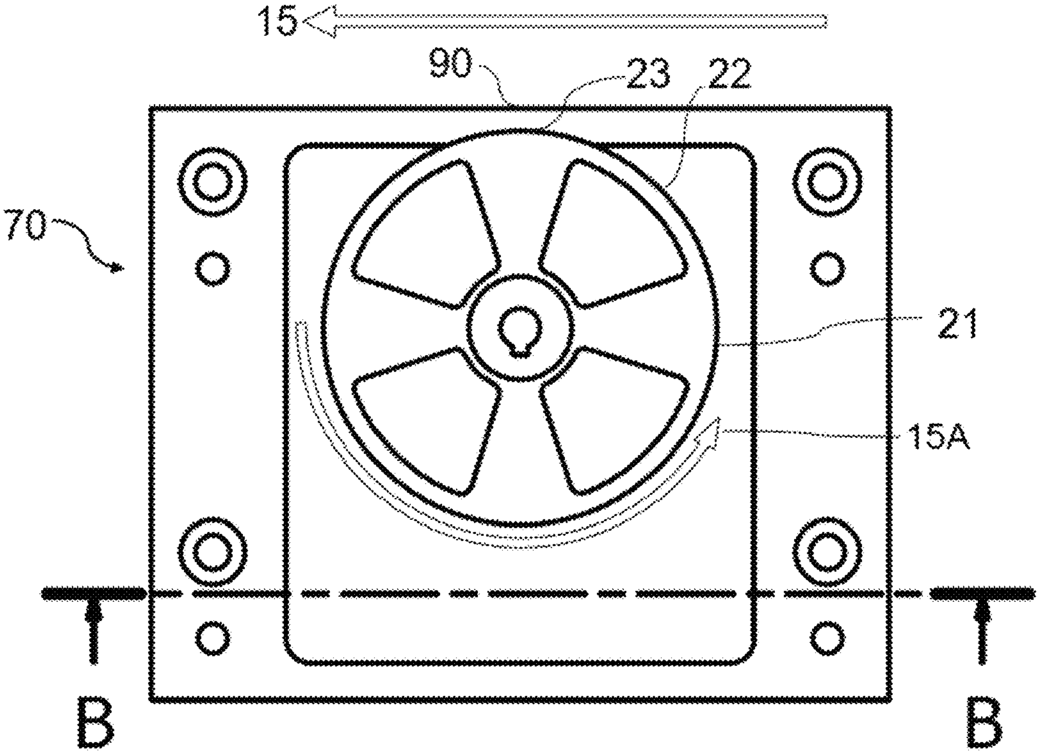
FIG. 13B shows the system of FIG. 13A in the closed position.

Preferably the shutter wheel 21 rotates in a direction 15A in coordination with the direction 15 of the panels (not shown) moving along the production line, as indicated in FIG. 13B.

In a manner analogous to that shown in FIG. 2 with application chamber 7 and frame 4, the application chamber 70 shown in FIG. 11 may be attached to a frame 4, for example by means of rivets, bolts, screws and the like using apertures 27.

Figure 14A:
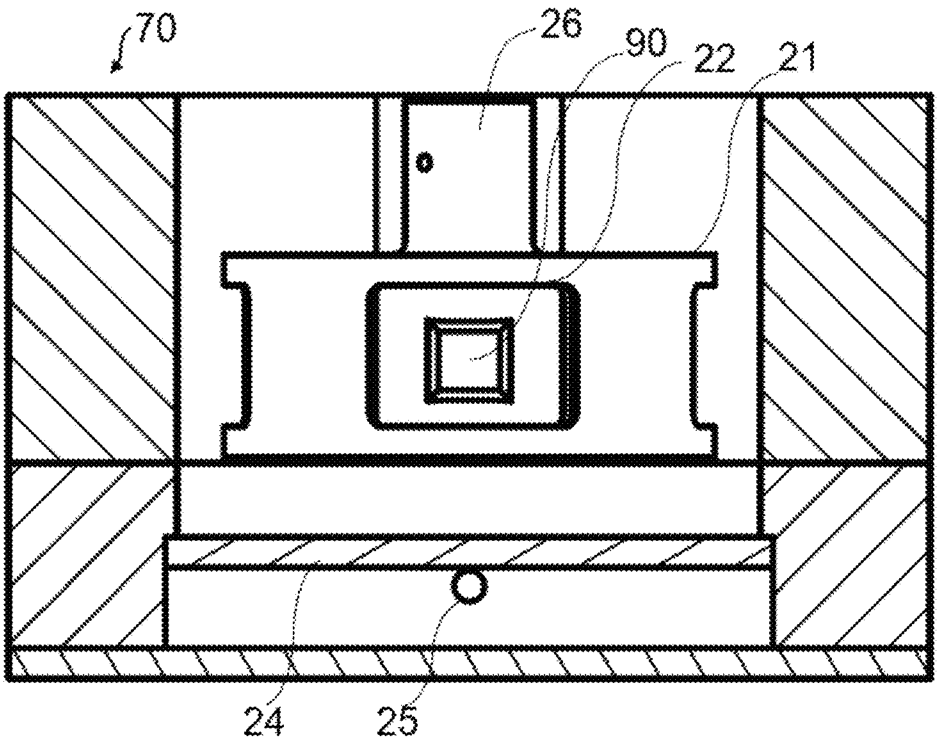
FIG. 14A shows the view A-A from FIG. 13A.

FIG. 14A corresponds to the cross-section A-A from FIG. 13A. It shows in more detail the open valve position for the shutter wheel 21, whereby a shutter rim opening 22 is aligned with the outlet 90. Plate 24 forms the base of the fluidised bed and is permeable to air. Air is directed into the fluidised bed from the base upwards via air inlet 25, through plate 24 and up through the powder, pressurising and thereby fluidising the powder. Plate 24 may be, for example, an air-permeable plastic with thickness 5-6 mm. Other suitable membrane materials for plate 24 may be implemented by those skilled in the art of fluidised bed design. This air flow generates positive pressure within the application chamber 70, which together with the action of gravity causes fluidised powder to flow from the application chamber 70 to a juxtaposed panel edge (not shown) when the valve system is in the open position as illustrated in FIG. 14A.

Figure 14B:
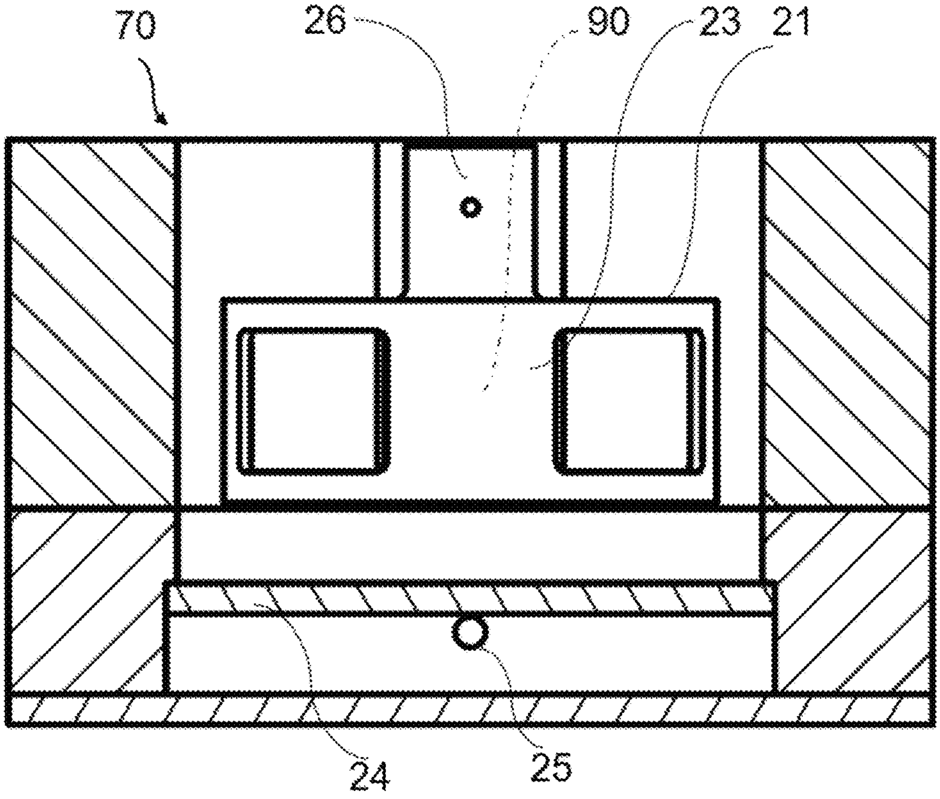
FIG. 14B shows the view B-B from FIG. 13B.

Similarly, FIG. 14B corresponds to the cross-section B-B from FIG. 14B. Here the closed valve position can be seen in more detail, whereby a shutter rim wall 23 aligns with the powder outlet 90 (not visible in FIG. 14B, but position indicated for reference).

The rotation speed of the shutter wheel 21 need not be constant and could run in a stepwise, stop-start manner according to the needs of the production line. The relative time periods at which the valve system is open and closed can be controlled such that powder only flows out when there is a panel edge to coat. This may be controlled by a system programme or, ideally, by a detector system in communication with the motor (not shown) for the shutter wheel. The detector system (not shown) may be set up in any appropriate manner to those known in the art, for example optical or thermal imaging on the production line to detect the presence or absence of a surface to coat.

In FIGS. 11-14, although not indicated, vacuum suction may be applied as described above with respect to FIGS. 1-10. However, vacuum suction is not essential when using a fluidised bed system to generate a flow of powder through the outlet 5, 90 to the panel edge 2. In this case, the vacuum suction may be applied to increase the air stream for the powder, to better retain the powder on the panel edge prior to film formation, other or a combination of purposes.

The valve system described with respect to FIGS. 11-14 may also be implemented with embodiments other than a fluidised bed powder handling apparatus.

The valve system illustrated in FIGS. 11-14 is a preferred implementation.

Another implementation (not shown) of the valve system is external to the fluidised bed application chamber 70. An apertured ring may be positioned around the application chamber 70, the ring acting as a shutter wheel. The ring comprises windows (shutter rim openings), interposing solid segments of the ring (shutter rim walls). The ring comprises means for engaging a motor, such as apertures functioning in the manner of a camera film.

Alternative valve systems suitable for use with the invention may involve a simple sliding gate or another suitable closable exit from the application chamber 7, 70 for the powder.

LIST OF REFERENCE NUMERALS

1 acoustic panel
2 minor face of acoustic panel
2*a* exposed part of minor face
2*b* abutting part of minor face
3 major face of acoustic panel
4 frame
5 vacuum suction inlet (powder outlet from application chamber to panel edge)
6 vacuum suction outlet
7 apparatus (application chamber)
8 powder inlet
9 powder outlet (for cleaning and recirculating powder)
10 higher density areas of panel edge
11 lower density areas of panel edge
12 direction of air flow in vacuum suction method
13*a* edge defects in panel
13*b* edge defects in painted panel (prior art)
14 painted surface (prior art)
15 direction of travel of panel on a continuous production line
15A direction of rotation of shutter wheel
16 powder
17 guide element
18 flat surface
19 heater
20 frame gap
21 Shutter wheel
22 Shutter rim opening
23 Shutter rim wall
24 Plate (base of fluidised bed)
25 Air inlet
26 Axel
27 Apertures
70 Powder handling apparatus (application chamber)
90 Fluidised powder outlet

The invention claimed is:

1. A method of coating a minor face of an acoustic panel, the acoustic panel comprising two opposed major faces and one or more minor faces that extend between the major faces, the method comprising the steps of applying a powder, wherein the powder comprises a particulate binder, to at least a part of a minor face, thereby forming a layer of powder on the minor face, and then treating the layer to form a film, wherein the acoustic panel is a man-made vitreous fibre panel, and wherein the powder further comprises a particulate filler.

2. The method according to claim 1, wherein the minor face is milled before application of the powder.

3. The method according to claim 1, wherein prior to application of the powder to the at least a part of a minor face, the powder is processed in a fluidised bed, and wherein the powder flows from the fluidised bed onto the at least a part of the minor face.

4. The method according to claim 3, wherein a valve system is positioned ahead of the minor face in the path of the fluidised powder, thereby controlling the flow of the powder.

5. The method according to claim 4, wherein the valve system comprises a shutter wheel, the shutter wheel rotating in cooperation with a conveyor system on which the acoustic panel is transported, wherein the shutter wheel comprises a rim wall and a rim opening to effect closed and open positions, respectively, of the valve system.

6. The method according to claim 1, wherein the powder is applied to a minor face by vacuum suction, wherein the vacuum suction is applied through the panel material.

7. The method according to claim 6, wherein at least part of the minor face to be coated is supported in a frame, the frame is provided with an inlet for the powder and the surfaces of the panel not to be coated are covered during vacuum suction, and wherein vacuum suction is applied to the panel, thereby drawing powder through the inlet and onto and into the surface to be coated.

8. The method according to claim 1, wherein the powder is packed or sprayed onto at least part of the minor face and levelled to make a smooth surface.

9. The method according to claim 1, wherein the step of treating the layer of powder on the minor face to form a film comprises heating.

10. The method according to claim 1, wherein the powder further comprises a pigment or dye component.

11. An acoustic panel comprising two major faces and one or more minor faces therebetween, characterised in that at least a portion of a minor face comprises a film formed according to claim 1, wherein the acoustic panel is a man-made vitreous fibre panel.

12. The acoustic panel according to claim 11, wherein the film comprises a pigment or dye.

13. The acoustic panel according to claim 11, wherein the film has a thickness of from 50 to 1000 μm.

14. A suspended ceiling or an acoustic wall comprising a support grid and a plurality of acoustic panels according to claim 11.

15. An acoustic ceiling comprising a plurality of suspended vertical baffles, wherein the vertical baffles are acoustic panels according to claim 11.

16. An acoustic ceiling comprising a free-hanging island, wherein the free-hanging island comprises an acoustic panel according to claim 11.

17. The acoustic panel according to claim 13, wherein the film has a thickness of from 50 to 500 μm.

18. The method according to claim 1, wherein the particulate filler is an inorganic filler.

19. The acoustic panel according to claim 11, wherein the particulate filler in the film is an inorganic filler.

* * * * *